May 8, 1956 V. C. HALL ET AL 2,744,950
ONE DIMENSIONAL UNSHARP MASKING
Filed Oct. 5, 1951
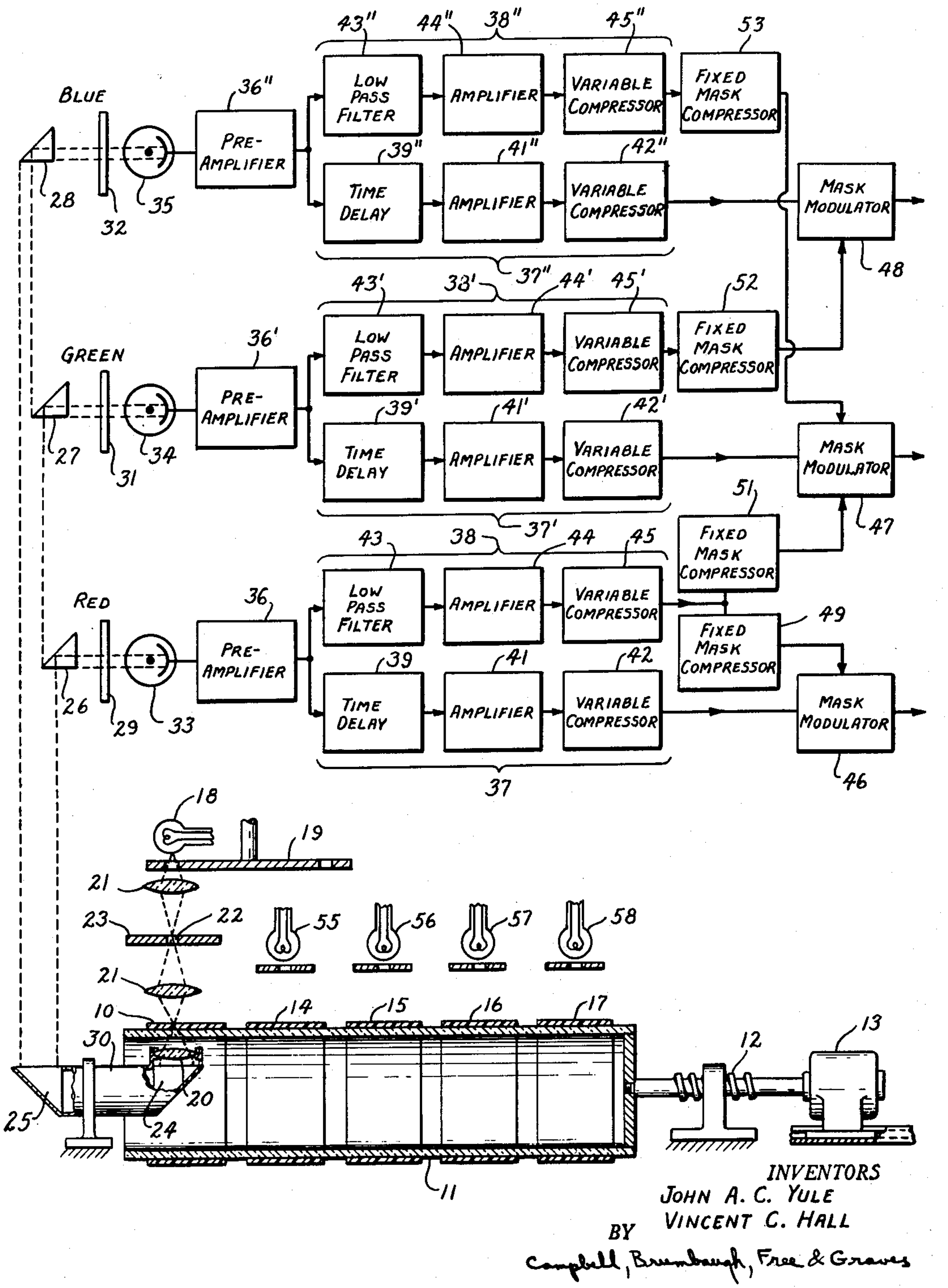
INVENTORS
JOHN A. C. YULE
VINCENT C. HALL
BY
Campbell, Brumbaugh, Free & Graves
THEIR ATTORNEYS 2,744,950
Patented May 8, 1956

1

2,744,950

ONE DIMENSIONAL UNSHARP MASKING

Vincent C. Hall, Stamford, Conn., and John A. C. Yule, Rochester, N. Y., assignors to Eastman Kodak Company, Rochester, N. Y., a corporation of New Jersey Application October 5, 1951, Serial No. 249,934

7 Claims. (Cl. 178—5.4)

The present invention relates to electronic color correction systems, and more particularly, to apparatus for deriving an "unsharp" masking electrical signal from an electrical signal representative of detailed variations in an optically-scanned subject.

Color correction by masking is a well-known procedure in color photography. It comprises essentially superimposing, in register, a high or normal contrast separation negative and a low contrast positive or a separation positive and a low contrast negative. Electro-optical systems embodying means for incorporating the masking procedure in making color separation negatives are also well known in the art.

It has been discovered that by using an "unsharp" mask, i. e., one lacking in fine detail to some extent, a marked improvement in the sharpness of the reproduction is produced. In particular, the degree of register required is not so close as where extremely sharp masks are used. This is of no importance where the masking is accomplished electronically. However, in both mechanical and electronic masking systems the use of "unsharp" masking results in considerable improvement in contrast in areas of fine detail. The advantages of using an "unsharp" mask to provide color correction are discussed in an article by J. A. C. Yule (Phot. Soc. of Am. Journal, March, 1945) where references to previous work in this field are given.

Electronic color correction systems have been devised wherein an electrical signal representative of detailed variations in one color in a subject being scanned are modified by a second electrical signal representing an "unsharp" mask of a different color in the subject. The second or masking electrical signal is generated by a photosensitive device responsive to an area of the optically-scanned subject substantially larger than the area to which the first electrical signal responds. This area selection is accomplished either by employing two scanning beams of different cross-sections or by rendering the first electrical signal responsive only to the central portion of the area scanned by a single beam.

It is a principal object of the present invention to derive an "unsharp" masking signal subsequent to the optical portion of the scanning system by operating upon the "sharp" electrical signal produced by a single scanning beam.

According to the invention, a subject embodying visual intelligence is scanned by a light beam of such small size as to permit detection of rapid variations in the subject. First and second electrical signals representative of these variations in the subject are generated. The first signal is delayed while the rapid variations in the second signal are reduced or suppressed by frequency-selective attenuation and/or amplification. This may be accomplished by means of a filter adapted to transmit only low frequency components of the second signal. Finally, the amplitude of the delayed first signal is varied in response to the amplitude of the filtered second signal. The reduction or suppression of the rapid variations in the second

2 signal renders the second signal responsive only to gradual variations in the subject. In other words, filtering the second signal blurs detail in the subject and provides an "unsharp" masking signal in the direction of scanning.

It is necessary to delay the first or "sharp" signal sufficiently to bring it into substantial time coincidence or registration with the filtered second signal, since the action of the filter unavoidably introduces a time lag. The required delay is substantially equal to one-half the maximum time taken by the filtered second signal to respond to a rapid variation in the subject. Generally, though not necessarily, the first signal is representative of detailed variations in one color in the subject while the second signal is representative of detailed variations in a different color in the subject. Under such conditions, the resultant modified signal is representative of detailed variations in one color in the subject masked by an "unsharp" mask of a different color.

In order that the invention may be more clearly understood, it will now be described in detail with reference to the single figure in the accompanying drawing which illustrates a schematic diagram of a portion of an electronic color correction system embodying the "unsharp" masking system of the present invention.

In the apparatus illustrated in the drawing, a subject 10, such as a Kodachrome transparency, is mounted for optical scanning on a transparent drum 11. Drum 11 is arranged to be rotated about its axis while slowly being fed axially by means of a coaxial lead screw 12 supporting the drum 11 and driven by a motor 13. The scanning drum 11 may be made of sufficient length to accommodate four separation negatives, 14, 15, 16 and 17 which are reproduced simultaneously with the scanning of subject 10.

The scanning is conventionally carried out by means of a light source 18 which is periodically interrupted by a continuously rotating light chopper 19. A lens system 21 directs the fluctuating light through a small aperture 22 in an opaque diaphragm 23 and focuses a sharp beam upon subject 10, which is a transparency in this embodiment of the invention.

The beam of light transmitted through subject 10 passes into the interior of transparent scanning drum 11 and is collimated by a lens 20 in a fixed optical assembly 30. A prism 24 directs the beam exteriorly of the drum 11 to a further prism 25 which projects the beam upon prisims 26, 27, and 28 to provide three separate paths. The three beams formed by prisms 26, 27 and 28 are directed through red, green and blue filters 29, 31 and 32 respectively, and the filtered light impinges upon photosensitive devices 33, 34 and 35, respectively.

The signal generated by photosensitive device 33 is applied to a preamplifier 36. The output of the preamplifier is simultaneously supplied to a main red signal channel 37 and a masking red signal channel 38. The main channel 37 comprises a time delay circuit 39, which may be an artificial delay line, a linear amplifier 41 and a variable compressor 42 connected in series. The masking channel comprises a low-pass filter 43, a linear amplifier 44 and a variable compressor 45 connected in series. The outputs of photosensitive devices 34 and 35 are fed to similar pairs of channels and corresponding elements thereof are designated by primed and double primed reference numerals, respectively.

The signals transmitted by the main red, green and blue channels 37, 37′ and 37″ are supplied to mask modulators 46, 47 and 48, respectively. A red masking signal, provided by masking channel 38, is applied through fixed mask compressors 49 and 51 to modify the main red signal in modulator 46 and the main green signal in modulator 47, respectively. It is to be noted that the main red signal is in effect "self-masked" by the red masking signal. A green masking signal, obtained from the masking channel 38', is compressed by a fixed mask compressor 52 and applied to modulator 48 to modify the main blue signal. A blue masking signal, obtained from the masking channel 38", is compressed by a fixed mask compressor 53 and applied to modulator 47 to modify the main green signal independently of the modification of such signal provided by the red masking signal. This modifying action may be accomplished by controlling the gain of a variable-mu amplifier tube in the modulators.

The modified or masked signals present in the output circuits of mask modulators 46, 47 and 48 may be fed through conventional color correction circuits, which are not shown because they form no part of the present invention, to provide signals for energizing glow lamps 55, 56, 57 and 58, which expose the four color separation negatives 14, 15, 16 and 17, respectively, in a well-known manner as the subject 10 is being scanned.

It is to be understood that the degree of "unsharpness" of the masking signals in channels 38, 38' and 38" may be independently determined by selecting the attenuation characteristics and upper cut-off frequencies associated with low-pass filters 43, 43' and 43", respectively. The time delay introduced into each main signal channel must be coordinated with the filter associated with that masking channel from which the particular masking signal is obtained in order that the mask appear in proper registration. Naturally, if desired, a proportion of the signal in any of the three preamplifiers can be used to provide any of the masking signals.

The above-described system provides, in a simple and effective manner, "unsharp" masking in the direction of rotation of the scanning drum 11 and "sharp" masking in the direction of axial feed.

We claim:

1. In an electronic color correction system, the combination of a subject in color to be scanned, means for scanning said subject with a single beam of light, means for generating a first signal in response to said beam representative of variations in one color of said subject, means for generating a second signal in response to said beam representative of variations in a different color of said subject, means for delaying the first signal, means for selectively amplifying the low frequency components of said second signal, and means for modulating the amplitude of the delayed first signal in accordance with the amplitude of the selectively amplified second signal.

2. In an electronic color correction system, the combination of a subject in color to be scanned, means for scanning said subject with a single beam of light, means for generating a first signal in response to said beam representative of variations in one color of said subject, means for generating a second signal in response to said beam representative of variations in a different color of said subject, means for filtering out the high frequency components of said second signal corresponding to detailed variations in said different color, means for delaying the first signal to retain substantial time coincidence with the filtered second signal, and means for varying the amplitude of the delayed first signal in response to the amplitude of the filtered second signal.

3. In an electronic color correction system, means for scanning a subject in color with a beam of light, means responsive to one color for generating a first electrical signal representative of relatively detailed variations in said one color of said subject, means responsive to a different color for generating a second electrical signal representative of relatively detailed variations in said different color of said subject, means for filtering the second signal to obscure the detailed variations and to emphasize the gradual variations in said subject, means for delaying the first signal sufficiently to bring the first signal into substantial time coincidence with the filtered second signal, and means for varying the amplitude of the delayed first signal in response to the amplitude of the filtered second signal to produce an output signal representative of variations in one color of a subject masked by an unsharp mask of a different color.

4. In a scanning system, means for scanning a subject with a beam of light, means for generating an electrical signal representative of relatively detailed variations in said subject, means for filtering said generated signal to obscure the detailed variations and to emphasize the gradual variations in said subject, means for independently delaying said generated signal sufficiently to bring the delayed signal into substantial time coincidence with the filtered signal, and means for varying the amplitude of the delayed signal in response to the amplitude of the filtered signal to produce an output signal representative of variation in said subject self-masked by an unsharp mask.

5. In a scanning system, optical means for scanning a visual subect by a single, fixed-size scanning spot, the said spot resolving rapid and gradual component variations in the visual intelligence in said subect into, respectively, high and low frequency component variations in the intensity of light emitted from said spot, photosensitive means responsive to said light to develop simultaneous first and second electric signals in, respectively, first and second channels fed from said photosensitive means, each of said signals having high and low frequency components corresponding, respectively, with the high and low frequency component variations in said light, frequency-selective means interposed in said second channel to transmit only the low frequency components of said second signal corresponding to said gradual variations in said intelligence, electric circuit means interposed in said first channel to delay said first signal to substantial time coincidence with the second signal transmitted from the frequency selective means, and means for varying the amplitude of the delayed first signal in response to the low frequency components of said second signal to produce an output signal representative of intelligence variations in said subject masked by an unsharp mask.

6. In a scanning system, optical means for scanning a visual subject by a single, fixed-size scanning spot the said spot resolving rapid and gradual component variations in the visual intelligence in said subject into, respectively, high and low frequency component variations in the intensity of light emitted from said spot, photosensitive means responsive to said light to develop simultaneous first and second electric signals in, respectively, first and second channels fed from said photosensitive means, each of said signals having high and low frequency components corresponding, respectively, with the high and low frequency component variations in said light, frequency-selective means interposed in said second channel for filtering said second signals to remove high frequency components corresponding to said rapid component variations in said intelligence, electric circuit means interposed in said first channel to delay said first signal to substantial time coincidence with the filtered second signal, and means for modifying the amplitude of the delayed first signal in response to the filtered second signal to produce an output signal representative of intelligence variations in said subject masked by an unsharp mask.

7. In a scanning system, optical means for scanning a visual subject by a single, fixed-size scanning spot, the said spot resolving rapid and gradual component variations in the visual intelligence in said subject into, respectively, high and low frequency component variations in the intensity of light emitted from said spot, photosensitive means responsive to said light to develop simultaneous first and second electric signals in, respectively, first and second channels fed from said photosensitive means, each of said signals having high and low frequency components corresponding, respectively, with the high and low frequency component variations in said light, frequency-selective means interposed in said second channel for suppressing the high frequency components of said second signal to obtain a resultant signal comprising only the low frequency components corresponding to said gradual variations in said intelligence, and modulating means for modifying the amplitude of said first signal in response to said resultant signal to produce an output signal representative of intelligence variations in said subject masked by an unsharp mask.

References Cited in the file of this patent

UNITED STATES PATENTS

| | | |
|---|---|---|
| 1,901,034 | Karolus | Mar. 14, 1933 |
| 1,950,011 | Scheibell | Mar. 6, 1934 |
| 2,165,168 | Hardy | July 4, 1939 |
| 2,286,730 | Hall | June 16, 1942 |
| 2,560,567 | Gunderson | July 17, 1951 |
| 2,606,245 | Hall | Aug. 5, 1952 |
| 2,691,696 | Yule | Oct. 12, 1954 |